United States Patent

Rösch

Patent Number: 5,908,903
Date of Patent: Jun. 1, 1999

[54] METALLOCENE CATALYST SYSTEMS CONTAINING LEWIS BASES

[75] Inventor: Joachim Rösch, Ludwigshafen, Germany

[73] Assignee: BASF Aktiengesellschaft, Ludwigshafen, Germany

[21] Appl. No.: 08/777,744

[22] Filed: Dec. 20, 1996

[30] Foreign Application Priority Data

Dec. 27, 1995 [DE] Germany .................. 195 48 784

[51] Int. Cl.$^6$ ...................................... C08F 4/642
[52] U.S. Cl. .................. 526/153; 526/133; 526/134; 526/135; 526/142; 526/160; 526/346; 526/348.3; 502/125; 502/132; 502/153; 502/154; 502/156; 585/511; 585/512
[58] Field of Search ............................ 526/142, 153, 526/160, 133, 135, 134; 585/511, 512; 502/153, 125, 132, 154, 156

[56] References Cited

U.S. PATENT DOCUMENTS

| | | | |
|---|---|---|---|
| 4,794,096 | 12/1988 | Ewen | 502/117 |
| 4,814,540 | 3/1989 | Watanabe et al. | 585/523 |
| 4,931,517 | 6/1990 | Fujita | 526/943 X |
| 4,945,076 | 7/1990 | Piotrowski et al. | 526/943 X |
| 5,171,919 | 12/1992 | Watanabe et al. | 525/523 |
| 5,276,117 | 1/1994 | Tomotsu et al. | 526/142 X |
| 5,328,969 | 7/1994 | Winter et al. | 526/127 |
| 5,374,752 | 12/1994 | Winter et al. | 556/11 |
| 5,455,365 | 10/1995 | Winter et al. | 556/7 |
| 5,457,171 | 10/1995 | Langhauser et al. | 526/133 X |
| 5,583,189 | 12/1996 | Geerts et al. | 526/142 X |

FOREIGN PATENT DOCUMENTS

| | | |
|---|---|---|
| 284 708 | 10/1988 | European Pat. Off. . |
| 488 533 | 6/1992 | European Pat. Off. . |
| 576 970 | 1/1994 | European Pat. Off. . |
| 648 7876 | 4/1995 | European Pat. Off. . |
| 2317312 | 2/1977 | France . |
| 1546912 | 5/1979 | United Kingdom . |
| 93/03067 | 2/1993 | WIPO . |
| 95/10546 | 4/1995 | WIPO . |
| 95/14044 | 5/1995 | WIPO . |

OTHER PUBLICATIONS

*Pat. Abst. of Japan,* vol. 18, No. 443 (C–1239), Aug. 18, 1994, (English abst. of JP 06 136053, May 17, 1994).
Costa et al., *Polymer Bulletin,* vol. 34, No. 5/6, May 1995, pp. 555–561.
Journal of Organometallic Chemistry, vol. 369, pp. 359–370 (1989).
Organometallics, vol. 7, pp. 409–416 (1988).

*Primary Examiner*—Fred Teskin
*Attorney, Agent, or Firm*—Keil & Weinkauf

[57] ABSTRACT

Catalyst systems which are suitable for polymerizing olefinically unsaturated compounds comprise as active constituents A) a metallocene complex of the metals of the fourth, fifth or sixth transition group of the Periodic Table of the Elements, B) a compound forming metallocenium ions and C) a sterically hindered, organic Lewis base.

6 Claims, No Drawings

METALLOCENE CATALYST SYSTEMS CONTAINING LEWIS BASES

The present invention relates to catalyst systems suitable for the polymerization of olefinically unsaturated compounds, which comprise as active constituents A) a metallocene complex of the metals of the fourth, fifth or sixth transition group of the Periodic Table of the Elements, B) a compound forming metallocenium ions and C) a sterically hindered Lewis base, and also a process for preparing polymers by linking at least two olefinically unsaturated monomers at from 0 to 450° C. and a pressure in the range from 0.1 to 500,000 kPa in the presence of a catalyst system.

Metallocene catalyst systems, ie. catalyst systems comprising metal complexes having at least one structural unit derived from the cyclopentadienyl ligands, are used to an increasing extent for the polymerization or oligomerization of olefinically unsaturated monomers.

Aspects of these catalyst systems which are in need of improvement are their productivity, expressed as the amount of polymer produced per amount of catalyst used, and also an increase in the molecular weight of the polymers obtainable using the metallocene catalysts.

In the interests of simplicity, the term polymerization will hereinafter be used to refer to the linking of at least two monomer units and the term polymers refers to dimers, oligomers, waxes and high polymers.

DE-A 26 30 585 describes the use of sterically hindered compounds $R_2Al(OR'')$ and $RAl(OR'')_2$ as cocatalysts in Ziegler catalyst systems. However, these compounds do not have an activity-increasing action in Ziegler olefin polymerization.

It is an object of the present invention to provide metallocene catalyst systems which are simple to prepare, have a high productivity in the polymerization of olefinically unsaturated monomers and also give polymers having an increased molecular weight.

We have found that this object is achieved by catalyst systems suitable for the polymerization of olefinically unsaturated compounds, which comprise as active constituents A) a metallocene complex of the metals of the fourth, fifth or sixth transition group of the Periodic Table of the Elements, B) a compound forming metallocenium ions and C) a sterically hindered Lewis base, and a process for preparing polymers by linking at least two olefinically unsaturated monomers at from 0 to 450° C. and a pressure in the range from 0.1 to 500,000 kPa in the presence of a catalyst system, wherein the catalyst system used comprises as active constituents A) a metallocene complex of the metals of the fourth, fifth or sixth transition group of the Periodic Table of the Elements, B) a compound forming metallocenium ions and C) a sterically hindered, organic Lewis base.

As component A), it is possible to use one metallocene complex or else a plurality of metallocene complexes.

For the purposes of the present invention, metallocene catalysts are materials which are generally formed by combining a transition metal compound or a plurality of transition metal compounds, preferably of titanium, zirconium or hafnium, containing at least one ligand which is, in the widest sense, a derivative of the cyclopentadienyl ligand with an activator, also known as cocatalyst or compound forming metallocenium ions, and are generally polymerization-active toward the monomers described. Such catalysts are described, for example, in EP-A 0 545 303, EP-A 0 576 970 and EP-A 0 582 194. The catalyst systems of the present invention generally comprise as active constituents A) a metallocene complex or a plurality of metallocene complexes of the general formula (I)

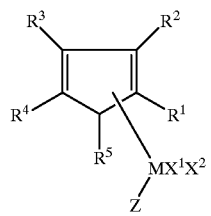

(I)

where the substituents and indices have the following meanings:

M is titanium, zirconium, hafnium, vanadium, niobium, tantalum, chromium, molybdenum or tungsten $X^1$, $X^2$ are fluorine, chlorine, bromine, iodine, hydrogen, $C_1$–$C_{10}$-alkyl, $C_6$–$C_{15}$-aryl, —$OR^6$ or —$NR^6R^7$ where $R^6$, $R^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{20}$-alkyl, 5- to 7-membered cycloalkyl which in turn can bear a $C_1$–$C_{10}$-alkyl group as substituent, $C_6$–$C_{15}$-aryl or arylalkyl, where two adjacent radicals may also together form a cyclic group having from 4 to 15 carbon atoms, or $Si(R^8)_3$ where $R^8$ is $C_1$–$C_{10}$-alkyl, $C_6$–$C_{15}$-aryl or $C_3$–$C_{10}$-cycloalkyl, Z is $X^1$, $X^2$ or

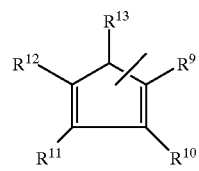

where the radicals $R^9$ to $R^{13}$ are hydrogen, $C_1$–$C_{20}$-alkyl, 5- to 7-membered cycloalkyl which in turn can bear a $C_1$–$C_{10}$-alkyl group as substituent, $C_6$–$C_{15}$-aryl or arylalkyl, where two adjacent radicals may also together form a cyclic group having from 4 to 15 carbon atoms, or $Si(R^{14})_3$ where $R^{14}$ is $C_1$–$C_{10}$-alkyl, $C_6$–$C_{15}$-aryl or $C_3$–$C_{10}$-cycloalkyl, or where the radicals $R^4$ and Z together form a group —$[Y(R^{15})(R^{16})]_n$—E—, where Y can be identical or different and are silicon, germanium, tin or carbon, $R^{15}$, $R^{16}$ are hydrogen, $C_1$–$C_{10}$-alkyl, $C_3$–$C_{10}$-cycloalkyl or $C_6$–$C_{15}$-aryl, n is 1, 2, 3 or 4, E is

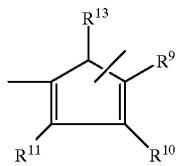

or A, where A is —O—, —S—,

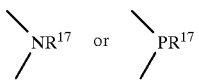

where $R^{17}$ is $C_1$–$C_{10}$-alkyl, $C_6$–$C_{15}$-aryl, $C_3$–$C_{10}$-cycloalkyl, alkylaryl or $Si(R^{18})_3$ where $R^{18}$ is $C_1$–$C_{10}$-alkyl, $C_6$–$C_{15}$-aryl, $C_3$–$C_{10}$-cycloalkyl or alkylaryl and B) a compound forming metallocenium ions.

Useful transition metal compounds (I) are

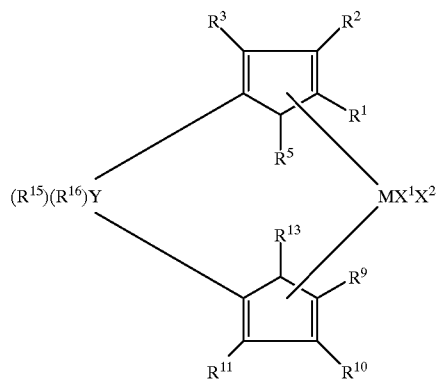

(Ia)

and

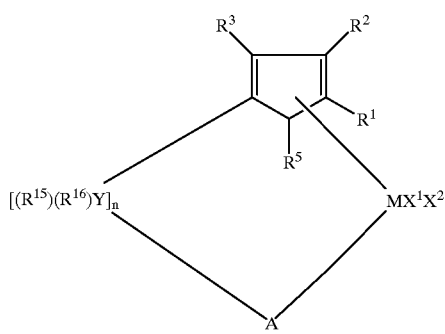

(Ib)

and

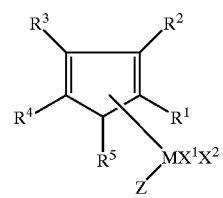

(Ic)

where Z is $X^1$, $X^2$ or

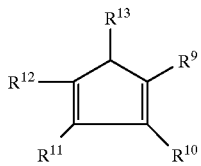

where $R^4$ and Z do not form a
group —$[Y (R^{15})(R^{16})]_n$—E—.

The terms metallocene complex or metallocene thus do not refer only to bis(η-cyclopentadienyl)metal complexes and their derivatives.

The radicals $X^1$, $X^2$ can be identical or different; they are preferably identical.

Particularly suitable compounds of the formula (Ia) are those in which $R^1$ and $R^9$ are identical and are hydrogen or $C_1$–$C_{10}$-alkyl, $R^5$ and $R^{13}$ are identical and are hydrogen, methyl, ethyl, isopropyl or tert-butyl, $R^2$, $R^3$, $R^{10}$ and $R^{11}$ are as follows: $R^3$ and $R^{11}$ are $C_1$–$C_4$-alkyl, $R^2$ and $R^{10}$ are hydrogen, or two adjacent radicals $R^2$ and $R^3$ or $R^{10}$ and $R^{11}$ together form cyclic groups having from 4 to 12 carbon atoms, $R^{15}$, $R^{16}$ are $C_1$–$C_8$-alkyl, M is titanium, zirconium or hafnium, Y is silicon, germanium, tin or carbon and $X^1$, $X^2$ is chlorine or $C_1$–$C_4$-alkyl.

Examples of particularly suitable complexes are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(3-tert-butyl-5-methylcyclopentadienyl)dimethylzirconium,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)dimethylzirconium,
dimethylsilanediylbis[3,3'-(2-methylbenzindenyl)]zirconium dichloride,
dimethylsilanediylbis(2-methylindenyl)hafnium dichloride,
dimethylsilanediylbis[3,3,'-(2-methylbenzindenyl)]hafnium dichloride,
dimethylsilanediylbis[3,3'-(2-methylbenzindenyl)]dimethylzirconium.

Particularly suitable compounds of the general formula (Ib) are those in which

M is titanium or zirconium, $X^1$, $X^2$ are chlorine or $C_1$–$C_{10}$-alkyl,

Y is silicon or carbon when n=1, or carbon when n=2, $R^{15}$, $R^{16}$ are $C_1$–$C_8$-alkyl, $C_5$–$C_6$-cycloalkyl or $C_6$–$C_{10}$-aryl, A is —O—, —S—,

and $R^1$ to $R^3$ and $R^5$ are hydrogen, $C_1$–$C_{10}$-alkyl, $C_3$–$C_{10}$-cycloalkyl, $C_6$–$C_{15}$-aryl or Si($R^8$)$_3$, or two adjacent radicals form a cyclic group having from 4 to 12 carbon atoms.

Particularly suitable compounds of the formula (Ic) are those in which Z is $X^1$ or $X^2$ and $X^1$ and $X^2$ are identical. It is then preferable that $X^1$, $X^2$ are halogen or $C_1$–$C_4$-alkyl and $R^1$ to $R^5$ in (Ic) are $C_1$–$C_4$-alkyl.

When Z in (Ic) is

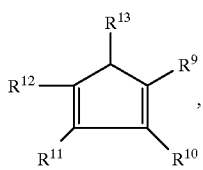

then $X^1$, $X^2$ are preferably halogen or $C_1$–$C_4$-alkyl and $R^1$ to $R^5$ and $R^9$ to $R^{13}$ are preferably hydrogen, $C_1$–$C_{20}$-alkyl such as methyl, ethyl, n-propyl, tert-butyl, n-hexyl, n-octyl, in particular octadecyl.

Examples of particularly suitable compounds (Ic) are pentamethylcyclopentadienyltrimethyltitanium, pentamethylcyclopentadienyltitanium trichloride and bis(octadecylcyclopentadienyl)zirconium dichloride, biscyclopentadienylzirconium dichloride, bis(pentamethylcyclopentadienyl)zirconium dichloride, bis(methylcyclopentadienyl)zirconium dichloride.

The synthesis of such transition metal compounds (I) can be carried out by methods known per se, with preference being given to reacting the appropriately substituted cycloalkenylanions with halides of transition metals, for example titanium, zirconium, hafnium, vanadium, niobium, tantalum, chromium, molybdenum or tungsten. Examples of appropriate preparative processes are described, inter alia, in Journal of Organometallic Chemistry, Vol. 369 (1989), pp. 359 –370.

Compounds B) forming metalloceniumions are known to those skilled in the art and described, for example, in WO 95/14044.

Examples of useful compounds B) are open-chain or cyclic aluminoxane compounds of the general formula (II) or (III)

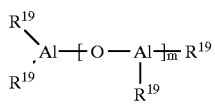

(II)

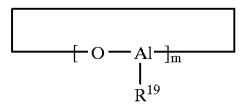

(III)

where $R^{19}$ is $C_1$–$C_4$-alkyl, preferably methyl or ethyl, and m is an integer from 5 to 30, preferably from 10 to 25.

The preparation of these oligomeric aluminoxane compounds is usually carried out by reacting a solution of trialkylaluminum with water and is described, inter alia, in EP-A 284 708 and U.S. Pat. No. 4,794,096.

In general, the oligomeric aluminoxane compounds thus obtained are in the form of mixtures of chain molecules of various lengths, both linear and cyclic, so that m is to be regarded as an average value. The aluminoxane compounds can also be in the form of mixtures with other metal alkyls, preferably with aluminum alkyls.

It has been found to be advantageous to use the metallocene complexes and the oligomeric aluminoxane compound in such amounts that the atom ratio of aluminum from the oligomeric aluminoxane compound to the transition metal from the metallocene complex is in the range from 10:1 to $10^6$:1, in particular in the range from 10:1 to $10^4$:1.

As compound B) forming metalloceniumions, it is also possible to use coordination compounds selected from the group consisting of strong, neutral Lewis acids.

As strong neutral Lewis acids, preference is given to compounds of the general formula IV $$M^2X^3X^4X^5,\qquad\text{(IV)}$$

where $M^2$ is an element of main group III of the Periodic Table, in particular B, Al or Ga, preferably B, $X^3$, $X^4$ and $X^5$ are hydrogen, $C_1$–$C_{10}$-alkyl, $C_6$–$C_{15}$-aryl, alkylaryl, arylalkyl, haloalkyl or haloaryl, each having from 1 to 10 carbon atoms in the alkyl radical and from 6 to 20 carbon atoms in the aryl radical, or fluorine, chlorine, bromine or iodine, in particular haloaryls such as fluoroaryls, preferably pentafluorophenyl.

Particular preference is given to compounds of the general formula (IV) in which $X^3$, $X^4$ and $X^5$ are identical, preferably tris(pentafluorophenyl)borane. These compounds and processes for their preparation are known per se and described, for example, in WO 93/3067.

It has been found to be particularly useful for the molar ratio of boron from the compound forming metalloceniumions to transition metal from the metallocene complex to be in the range from 0.1:1 to 10:1, in particular in the range from 1:1 to 5:1.

The compounds B) forming metalloceniumions are usually used alone, in admixture with one another or in admixture with organometallic compounds of the first to third main group of the Periodic Table of the Elements, for example n-butyllithium, di-n-butylmagnesium, butyloctylmagnesium, trimethylaluminum, triethylaluminum, triisobutylaluminum, diisobutylaluminum hydride, with the mixing ratio of the components generally not being critical.

Preference is given to using $C_1$–$C_{10}$-alkylaluminoxanes, in particular methylaluminoxane, as compound B) forming metalloceniumions.

For the purposes of the present invention, sterically hindered organic Lewis bases (C) are organic compounds containing at least one atom having at least one free electron pair and in which this atom or these atoms has or have at least one directly adjacent group which largely shields it and which can cause steric hindrance. In general, these groups are organic carbon radicals or organosilicon radicals having a high space requirement (bulky radicals). The number of carbon atoms in such radicals is usually not less than three.

Suitable non-aromatic, bulky radicals are those organic carbon radicals or organosilicon radicals which are branched in the α position or a higher position. Examples of such radicals are branched $C_3$–$C_{20}$-aliphatic radicals, $C_9$–$C_{20}$-araliphatic radicals and $C_3$–$C_{10}$-cycloaliphatic radicals, for example iso-propyl, tert-butyl, iso-butyl, neo-pentyl, 2-methyl-2-phenylpropyl (neophyl), cyclohexyl, 1-methylcyclohexyl, bicyclo[2.2.1]hept-2-yl (2-norbornyl), bicyclo[2.2.1]hept-1-yl (2-norbornyl), adamantyl. Other suitable radicals of this type are organosilicon radicals having from three to thirty carbon atoms, for example trimethylsilyl, triethylsilyl, triphenylsilyl, tert-butyldimethylsilyl, tritolylsilyl or bis(trimethylsilyl)methyl.

Suitable aromatic, bulky groups are generally $C_6$–$C_{20}$-aryl radicals such as phenyl, 1- or 2-naphthyl or preferably $C_1$–$C_{10}$-alkyl- or $C_3$–$C_{10}$-cycloalkyl-substituted aromatic radicals such as 2,6-dimethylphenyl, 2,6-di-tert-butylphenyl or mesityl.

Possible atoms having a free electron pair or free electron pairs are nitrogen, preferably in the form of organic amines, phosphorus, preferably as organic phosphines, arsenic, preferably as organic arsines, antimony, preferably as organic stibines, oxygen, preferably as hydroxy or aluminoxy compounds, or sulfur, preferably as thiols. Well suited Lewis bases are those containing nitrogen, phosphorus, oxygen or sulfur, in particular those containing oxygen.

Very useful organic Lewis bases are those aryloxy compounds of the general formula (V) in which the substituents and indices have the following meanings:

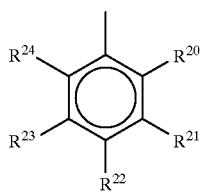

(Va)

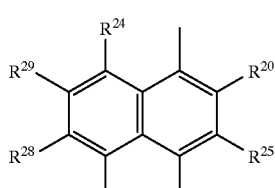

(Vb)

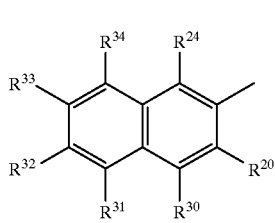

(Vc)

$R^{20}$, $R^{24}$ are then branched $C_3$–$C_{20}$-aliphatic radicals, branched $C_9$–$C_{20}$-araliphatic radicals, $C_3$–$C_{10}$-cycloaliphatic radicals, organosilicon radicals —$SiR'_3$ having from three to thirty carbon atoms, $C_6$–$C_{20}$-aryl radicals which may be monosubstituted or polysubstituted by $C_1$–$C_{10}$-alkyl or cycloalkyl. Examples of such radicals are iso-propyl, tert-butyl, iso-butyl, neo-pentyl, 2-methyl-2-phenylpropyl (neophyl), cyclohexyl, 1-methylcyclohexyl, bicyclo[2.2.1]hept-2-yl (2-norbornyl), bicyclo[2.2.1]hept-1-yl (1-norbornyl), adamantyl, trimethylsilyl, triethylsilyl, triphenylsilyl, tert-butyldimethylsilyl, tritolylsilyl or bis(trimethylsilyl)methyl, phenyl, 2,6-dimethylphenyl, 2,6-di-tert-butylphenyl, mesityl, 2,6-di-tert-butyl-4-methylphenyl.

$R^{21}$, $R^{22}$, $R^{23}$, $R^{25}$, $R^{26}$, $R^{27}$, $R^{28}$, $R^{29}$, $R^{30}$, $R^{31}$, $R^{32}$, $R^{34}$ are hydrogen, halogen, preferably chlorine, $C_1$–$C_{10}$-alkyl such as methyl, ethyl, n-propyl, n-butyl, tert-butyl, n-hexyl, preferably methyl, and can also be $C_6$–$C_{10}$-aryl such as phenyl or tolyl.

X in (V) is hydrogen or —$AlR^{35}R^{36}$, where $R^{35}$, $R^{36}$ are $C_1$–$C_{10}$-alkyl such as methyl, ethyl, n-propyl, iso-propyl, n-butyl, sec-butyl, tert-butyl and preferably methyl, ethyl, iso-butyl. $R^{35}$, $R^{36}$ may also be $C_6$–$C_{10}$-aryl, preferably phenyl, mesityl, 2,6-di-tert-butyl-4-methylphenyl. One of the radicals $R^{35}$, $R^{36}$ can also be an Ar-O radical, where Ar is as defined for (Va), (Vb) and (Vc).

The aryloxyaluminum compounds Ar-O-$AlR^{35}R^{36}$ are generally obtainable by reacting the respective organoaluminum compounds $AlR^{35}R^{36}R^{37}$, where $R^{37}$ is hydrogen or as defined for $R^{35}$, $R^{36}$, with the appropriate hydroxyaryl compound Ar-OH, generally in a molar ratio Al:Ar-OH of from 1:1 to 1:2, as described by way of example in Organometallics (1988), Volume 7, pages 409–416.

For the preparation of preferred aryloxyaluminum compounds $(ArO)_2AlR^{35}$, $(ArO)AlR^{35}R^{36}$, where $R^{35}$, $R^{36}$ are not ArO—, suitable arylhydroxy compounds are the following, which also represent preferred Lewis bases C). Preferred phenol derivatives (V) are bis-2,6-trimethylsilyl-4-methylphenol, 2,4,6-tri-tert-butylphenol, in particular 2,6-di-tert-butyl-4-methylphenol (BHT).

Preferred 1-naphthol derivatives (V) are 2,4,8-tris(trimethylsilyl)naphthol, 2,4,8-tri-tert-butylnaphthol, in particular 2,8-di-tert-butyl-4-methylnaphthol.

Preferred 2-naphthol derivatives (V) are 1,3-di-tert-butyl-2-naphthol, 1,3-trimethylsilyl-2-naphthol, in particular 1,3-di-tert-butyl-2-naphthol.

The molar ratio of Lewis base C), in particular the compounds (V), to the transition metal component A) is generally in the range from 0.0001:1 to 10,000:1, preferably in the range from 0.0001:1 to 2000:1.

The molar ratio of Lewis base C), in particular compounds (V), to the compound B) forming metalloceniumions is usually in the range from 1:1000 to 10,000:1, preferably in the range from 1:10 to 1000:1.

The components A), B) and C) of the catalyst system can be mixed in any order, preferably in solution in inert hydrocarbons such as ethylbenzene, toluene, heptane, hexane, and then brought into contact with the monomer(s). However, particularly good results are obtained when the metallocene component A) is premixed with the component B) forming metallocenium ions and then added to the monomer(s), and the Lewis base C), preferably the compounds (V) and in particular the aryloxyaluminum compounds from (Va), is subsequently added to the mixture.

The catalyst systems of the present invention can also be used on a support material.

As support materials, preference is given to using finely divided supports which preferably have a partial diameter in the range from 1 to 300 μm, in particular from 30 to 70 μm. Suitable support materials are, for example, silica gels, preferably those of the formula $SiO_2.a\ Al_2O_3$, where a is a number from 0 to 2, preferably from 0 to 0.5; these are thus aluminosilicates or silicon dioxide. Such products are commercially available, eg. silica gel 332 from Grace. Further supports are, inter alia, finely divided polyolefins, for example finely divided polypropylene.

The catalyst systems of the present invention enable the preparation of oligomers, waxes and high polymers from olefinically unsaturated hydrocarbons.

Suitable olefinically unsaturated hydrocarbons are, for example, ethylene, $C_3$–$C_{12}$-alk-1-enes such as propene, 1-butene, iso-butene, 1-pentene, 4-methyl-1-pentene, 1-hexene, 1-heptene, 1-octene, 1-nonene, 1-decene, 1-undecene, 1-dodecene, also styrene, α-methylstyrene, cycloolefins such as cyclopentene, norbornene or else dienes such as 1,3-butadiene, 1,4-hexadiene, 1,5-hexadiene or norbornadiene. Preference is given to using ethylene, propene, 1-hexene, 1-octene, 1-decene or styrene as olefinically unsaturated hydrocarbon monomers.

In general, oligomers are advantageously obtainable using catalyst systems comprising unbridged metallocene complexes of the formula (Ic); for the high polymers, the catalyst systems of the general formulae (Ia) or (Ib) are particularly useful.

The oligomers, preferably homooligomers or cooligomers of ethylene, propene, 1-butene or 1-decene generally have a mean molecular weight Mw, determined by gel permeation chromatography in tetrahydrofuran at 30° C. against polystyrene as standard, in the range from 100 to 10,000, preferably in the range from 200 to 5000.

The high polymers, preferably homopolymers or copolymers of ethylene, propene, 1-butene, 1-hexene, 1-octene or styrene usually have a mean molecular weight Mw, determined by gel permeation chromatography (GPC) in 1,2,4-trichlorobenzene at 135° C. against polyethylene or polypropylene as standard, in the range from 10,000 to $5 \cdot 10^6$, preferably in the range from 30,000 to $2 \cdot 10^6$.

The addition of the Lewis base C) generally leads to an increase in the mean molecular weight Mw by about 1–20% in comparison with analogous catalyst systems without Lewis base.

The molecular weight distribution Mw/Mn of the polymers of olefinically unsaturated hydrocarbons, measured using the GPC method as described above, is usually in the range from 1.4 to 5.0, preferably in the range from 1.8 to 3.2.

The preparation of the polymers from the olefinically unsaturated hydrocarbons can be carried out either continuously or preferably batchwise in the customary reactors.

Suitable reactors-include continuously operated stirred vessels, where a series of a plurality of stirred vessels connected in series may also be used. The polymerization reactions can be carried out in the gas phase, in suspension, in liquid and in supercritical monomers or in inert solvents.

The polymerization conditions are not critical in themselves. Pressures of from 0.1 to 500,000 kPa, preferably from 100 to 250,000 kPa and in particular from 100 to 100,000 kPa, temperatures of from 0 to 450° C., preferably from 20 to 250° C. and in particular from 50 to 100° C, have been found to be suitable. The mean molecular weight of the polymers can be controlled using the methods customary in polymerization technology, for example by feeding in molecular weight regulators such as hydrogen, which generally leads to a reduction in the molecular weight of the polymer, or by varying the polymerization temperature, with high polymerization temperatures usually leading to reduced molecular weights.

In a preferred process, a mixture of the metallocene complex A) and methylaluminoxane as component B) in toluene is metered into the monomer. Shortly afterwards, the Lewis base C) is added to the polymerization mixture.

EXAMPLES

Experiments 1, 2C, 5, 6

Propene polymerizations at 2000 kPa

A steel autoclave having a utilizable volume of 1 l was charged with propene and the latter was heated to 50° C., with a pressure of 2000 kPa being established in the reactor. A solution of the metallocene compound A) in 32 ml (Experiment No. 5:16 ml, Experiment No. 6:4 ml) of 1.7M methylaluminoxane solution in toluene as component B) was then added (Al: transition metal=500:1). Five minutes later, the Lewis base C) dissolved in ethylenebenzene was added. The polymerization reaction was continued until the reactor pressure had dropped just below 300 kPa (from 25 to about 90 minutes, depending on the catalyst system). Excess propylene was then vented and the reaction product was isolated and analyzed.

Experiment 3

Simultaneous addition of the Lewis base C)

The procedure of Experiment 1 was repeated, but the Lewis base C) was dissolved beforehand in the catalyst solution.

Experiment 4

Addition of the aryloxyaluminum compound

The procedure of Experiment 1 was repeated, but a solution of 2.2 g (100 mmol) of 2,6-di-tert-butyl-4-methylphenol and 9.96 g (50 mmol) of triisobutylaluminum in 50 ml of toluene was added in place of the pure phenol component.

Experiments 7 to 13 and 15, 15C

Polymerizations of ethylene, propene and 1-decene at atmospheric pressure

A 1 l three-neck flask was charged with 500 ml of pentane and a mixture of metallocene component A) in 32 ml of 1.7M methylaluminoxane solution in toluene was added at 40° C. The gaseous monomer was then passed into the pentane mixture. In the case of the liquid 1-decene as monomer, this was initially charged in the pentane before addition of the metallocene/methylaluminoxane mixture. Ten minutes after adding the catalyst, the Lewis base C) was added and the polymerization was carried out for 5 hours; the polymer or oligomer was isolated and characterized.

Experiment 14

Polymerization of propylene using a cationic activator 350 g of propylene were condensed into a 1 l steel autoclave and heated to 50° C., with a pressure of 2000 kPa being established. A solution of the metallocene compound in 50 ml of toluene and a solution of 0.99 g (5 mmol) of triisobutylaluminum in 50 ml of toluene were then added and the polymerization was initiated by addition of 80 mg (0.1 mmol) of dimethylanilinium tetrakis (pentafluorophenyl)borate dissolved in 20 ml of toluene. After five minutes, the reaction product from 11 mg (0.5 mmol) of 2,6-di-tert-butyl-4-methylphenol and 12.5 mg (0.25 mmol) of triisobutylaluminum dissolved in 20 ml of ethylbenzene was added. The polymerization was continued until the reactor pressure had dropped just below 300 kPa (30 minutes). Excess propylene was removed and the reaction product was isolated and analyzed.

Experiments 16, 16C

Polymerization of styrene 104.1 g (1.0 mol).of styrene were placed in a round-bottom flask and, at 60° C., 12 ml (110 mmol) of 10% strength methylaluminoxane solution in toluene and 7.6 mg (0.033 mmol) of pentamethylcyclopentadienyltrimethyltitanium were added. The additive component C) was then added and the polymerization was carried out for 3 minutes, the polymer was precipitated with 60 ml of methanol, isolated and characterized.

The parameters and results of the olefin or styrene polymerizations are summarized in Table 1. A "C" after the experiment number denotes an experiment without addition of the component C) as a comparison with the immediately preceding experiment.

TABLE 1

Polymerization and oligomerization of olefins and of styrene

| Exp. No. | Metallocene A) mg/mmol | Lewis base C) mg/mmol | Ratio of Lewis base C): metallocene A) | Monomer | Activity g of polymer/mmol of metal*h | $M_n$; $M_w/M_n$ | Melting point °C.[b] |
|---|---|---|---|---|---|---|---|
| 1 | M1,80/0.1 | 1/2200/10 | 100:1 | Propene, 350 g | 6600 | 640;2.1 | Liquid |
| 2C | M1,80/0.1 | — | — | Propene, 350 g | 2250 | 490;2.2 | Liquid |
| 3 | M1,80/0.1 | 1/11000/50 | 500:1 | Propene, 350 g | 3200 | 580;2.2 | Liquid |
| 4 | M1,80/0.1 | 2/22000/100 | 500:1 | Propene, 350 g | 7920 | 1040;2.5 | Liquid |
| 5 | M1,40/0.05 | 1/22000/100 | 2000:1 | Propene, 350 g | 15840 | 1360;2.6 | Liquid |
| 6 | M1,8/0.01 | 1/220/1 | 100:1 | Propene, 350 g | 44000 | 1480;2.4 | Liquid |
| 7 | M2,42/0.1 | 1/11000/50 | 500:1 | Propene, 100 g/h | 860 | 19800;1.9 | 132 |
| 8C | M2,42/0.1 | — | — | Propene, 100 g/h | 620 | 15200;1.9 | 130 |
| 9 | M3,58/0.1 | 1/11000/50 | 500:1 | Propene, 100 g/h | 940 | 121000;1.7 | 150 |
| 10C | M3,58/0.1 | — | — | Propene, 100 g/h | 760 | 89000;1.8 | 150 |
| 11 | M3,58/0.1 | 1/11000/50 | 500:1 | Decene, 300 ml | 580 | 18900;2.4 | Liquid |
| 15C | M3,58/0.1 | — | — | Decene, 300 ml | 400 | 16000;2.4 | Liquid |
| 12 | M4,29/0.1 | 1/11000/50 | 500:1 | Ethylene, 100 g/h | 920 | 290000;2.3 | 107 |
| 13C | M4,29/0.1 | — | — | Ethylene, 100 g/h | 640 | 195000;2.4 | 107 |
| 14 | M1,80/0.1 | 2 | 2,5:1 | Propene, 350 g | 6600 | 670;2.1 | Liquid |
| 16 | M5,7,6/0.03 | 1/0,068/0.00033 | 0,0099:1 | Styrene, 104.1 g | 1536 | 150700;2.0 | Syndiotacticity[a] 98% |
| 16C | M5,7,6/0.033 | — | — | Styrene, 104.1 g | 1124 | 139500;2.1 | Syndiotacticity[a] 98% |

Notes for Table 1
M1 = bis(n-octadecylcylopentadienyl)zirconium dichloride
M2 = rac-ethylenebis(indenyl)zirconium dichloride
M3 = rac-dimethylsilanediylbis[3,3'-(2-methylbenzindenyl)]-zirconium dichloride
M4 = bis(cyclopentadienyl)zirconium dichloride
M5 = pentamethylcyclopentadienyltrimethyltitanium
1 = 2,6-di-tert-butyl-4-methylphenol
2 = bis(2,6-di-tert-butyl-4-methylphenoxy)monoisobutylaluminum
[a] measured using $^{13}$C-NMR spectroscopy
[b] measured using differential scanning calorimetry (DSC).

We claim:

1. A catalyst system suitable for the polymerization of olefinically unsaturated compounds, which comprises as active constituents A) a metallocene complex of the metals of the fourth, fifth or sixth transition group of the Periodic Table of the Elements, B) a compound forming metallocenium ions and C) a sterically hindered aryloxyaluminum compound.

2. A catalyst system as claimed in claim 1, wherein the component B) is a $C_1$–$C_{10}$-aluminoxane.

3. A catalyst system as claimed in claim 1, wherein the sterically hindered aryloxyaluminum compound C) is a phenol derivative, naphthol derivative or hydroxyanthracene derivative, in which the substitutable ring positions directly adjacent to the aluminoxy group bear bulky radicals.

4. A process for preparing polymers by linking at least two olefinically unsaturated monomers at from 0 to 450° C. and a pressure in the range from 0.1 to 500,000 kPa in the presence of a catalyst system, wherein the catalyst system used comprises as active constituents A) a metallocene complex of the metals of the fourth, fifth or sixth transition group of the Periodic Table of the Elements, B) a compound forming metallocenium ions and C) a sterically hindered aryloxyaluminum compound.

5. A process as claimed in claim 1, wherein the component B) is a $C_1$–$C_{10}$-aluminoxane.

6. A process as claimed in claim 1 wherein the sterically hindered aryloxyaluminum compound C) is a phenol derivative, naphthol derivative or hydroxyanthracene derivative, in which the substitutable ring positions directly adjacent to the aluminoxy group bear bulky radicals.

* * * * *

UNITED STATES PATENT AND TRADEMARK OFFICE
CERTIFICATE OF CORRECTION

PATENT NO. : 5,908,903
DATED : June 1, 1999
INVENTOR(S) : Joachim ROESCH

It is certified that error appears in the above-identified patent and that said Letters Patent is hereby corrected as shown below:

Col. 12, claim 5, line 55, delete "1" and substitute --4--.

Col. 12, claim 6, line 46, delete "1" and substitute --5--.

Signed and Sealed this

Seventh Day of September, 1999

Attest:

Q. TODD DICKINSON

*Attesting Officer*     *Acting Commissioner of Patents and Trademarks*